United States Patent
Zampieron et al.

(10) Patent No.: US 8,345,097 B2
(45) Date of Patent: Jan. 1, 2013

(54) HYBRID REMOTE DIGITAL RECORDING AND ACQUISITION SYSTEM

(75) Inventors: Jeffrey Zampieron, Rochester, NY (US); Joseph Presicci, Rochester, NY (US); Mark Sanders, Rochester, NY (US); Robert Post, Victor, NY (US)

(73) Assignee: Harris Corporation, Melbourne, FL (US)

( * ) Notice: Subject to any disclaimer, the term of this patent is extended or adjusted under 35 U.S.C. 154(b) by 1039 days.

(21) Appl. No.: 12/070,386

(22) Filed: Feb. 15, 2008

(65) Prior Publication Data

US 2009/0207247 A1 Aug. 20, 2009

(51) Int. Cl.
*H04N 7/18* (2006.01)
(52) U.S. Cl. .................. 348/143; 348/154; 396/427
(58) Field of Classification Search .............. 348/143
See application file for complete search history.

(56) References Cited

U.S. PATENT DOCUMENTS

| | | | |
|---|---|---|---|
| 4,468,710 A | 8/1984 | Hashimoto et al. | |
| 5,574,662 A | 11/1996 | Windrem et al. | |
| 5,576,902 A | 11/1996 | Lane et al. | |
| 5,850,352 A * | 12/1998 | Moezzi et al. | 345/419 |
| 5,980,123 A * | 11/1999 | Heifler | 396/427 |
| D473,200 S | 4/2003 | Isshiki | |
| 7,233,781 B2 * | 6/2007 | Hunter et al. | 455/404.1 |
| 7,327,253 B2 * | 2/2008 | Whitten et al. | 340/541 |
| 7,633,391 B2 * | 12/2009 | Voglewede et al. | 340/541 |
| 7,999,842 B1 * | 8/2011 | Barrus et al. | 348/37 |
| 2001/0033330 A1 * | 10/2001 | Garoutte | 348/153 |
| 2002/0015094 A1 | 2/2002 | Kuwano et al. | |
| 2003/0021490 A1 * | 1/2003 | Okamoto et al. | 382/284 |
| 2003/0122667 A1 * | 7/2003 | Flynn | 340/540 |
| 2004/0100563 A1 * | 5/2004 | Sablak et al. | 348/211.4 |
| 2004/0143732 A1 * | 7/2004 | Choi et al. | 713/151 |
| 2004/0217881 A1 * | 11/2004 | Pedyash et al. | 340/870.07 |
| 2005/0010808 A1 * | 1/2005 | Wixson et al. | 713/200 |
| 2005/0128291 A1 * | 6/2005 | Murakami | 348/143 |
| 2005/0258942 A1 * | 11/2005 | Manasseh et al. | 340/425.5 |
| 2006/0120397 A1 * | 6/2006 | Kreiner et al. | 370/437 |
| 2006/0176167 A1 * | 8/2006 | Dohrmann | 340/506 |
| 2007/0017136 A1 * | 1/2007 | Mosher et al. | 40/633 |
| 2007/0024707 A1 | 2/2007 | Brodsky | |
| 2007/0052697 A1 * | 3/2007 | Cohignac et al. | 345/418 |
| 2007/0127774 A1 * | 6/2007 | Zhang et al. | 382/103 |
| 2007/0211145 A1 * | 9/2007 | Kilian et al. | 348/148 |
| 2007/0262857 A1 | 11/2007 | Jackson | |
| 2007/0291118 A1 * | 12/2007 | Shu et al. | 348/156 |
| 2008/0024605 A1 * | 1/2008 | Osann, Jr. | 348/143 |
| 2008/0024610 A1 * | 1/2008 | Konishi | 348/159 |
| 2008/0031526 A1 * | 2/2008 | Bushell et al. | 382/224 |
| 2008/0043101 A1 * | 2/2008 | Sharma | 348/143 |
| 2008/0111884 A1 * | 5/2008 | Cloutier et al. | 348/152 |
| 2008/0117046 A1 * | 5/2008 | Cruzado | 340/568.2 |
| 2008/0231709 A1 * | 9/2008 | Brown et al. | 348/169 |

(Continued)

*Primary Examiner* — Firmin Backer
*Assistant Examiner* — Hamza Algibhah
(74) *Attorney, Agent, or Firm* — Harness, Dickey & Pierce, PLC (57) ABSTRACT

A surveillance system includes an event module that receives an event detection signal that indicates an event external to the surveillance system. The system also includes a power control module that selectively operates a data recording device at least partially concurrent with the event based on the event detection signal. The system also includes a selection module that selects a portion of data recorded by the data recording device based on content of the data. A data transmission module transmits the portion over a remote communication link.

16 Claims, 5 Drawing Sheets

U.S. PATENT DOCUMENTS

| | | |
|---|---|---|
| 2008/0284580 A1* | 11/2008 | Babich et al. .................. 340/502 |
| 2009/0207046 A1* | 8/2009 | Arrighetti ..................... 340/937 |
| 2010/0019045 A1* | 1/2010 | Sarkissian et al. ............ 235/492 |
| 2010/0031064 A1* | 2/2010 | Walmsley .................... 713/194 |
| 2010/0231713 A1* | 9/2010 | Oyabu et al. .................. 348/143 |
| 2010/0259539 A1* | 10/2010 | Papanikolopoulos et al. ............................. 345/420 |

\* cited by examiner

HYBRID REMOTE DIGITAL RECORDING AND ACQUISITION SYSTEM

FIELD

The present disclosure relates to sensor systems, and more particularly to unattended sensor systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Throughout the world, military and homeland security forces face an increasing need to provide safety and security to troops and high-value assets. Wireless surveillance systems are emerging as a way of meeting this need. However, when developing a communications system for military application, a variety of obstacles need to be overcome. For example, remotely located wireless surveillance systems often include video recording devices that may rapidly consume limited power resources.

Generally, however, remotely located portions of wireless surveillance systems should be configured to operate in a manner that conserves power resources.

SUMMARY

A surveillance system includes an event module that receives an event detection signal that indicates an event external to the surveillance system. The system also includes a power control module that selectively operates a data recording device at least partially concurrent with the event based on the event detection signal. The system also includes a selection module that selects a portion of data recorded by the data recording device based on content of the data. A data transmission module transmits the portion over a remote communication link.

In other features, the data recording device records at least one of video and audio data. The power control module selectively operates the data recording device by switching the data recording device between power modes. The power modes include at least two of an off mode, a sleep mode, an idle mode and an active mode. The portion includes at least one of a video frame and an audio clip. The system also includes an analysis module that determines the content of the data based on at least one of detecting motion and detecting objects in the video data. The analysis module determines the content of the data based on at least one of detecting sound modulation and detecting specific sounds within the audio data.

In other features, the selection module selects the video frame to be one or more frames of video that include at least one of a comparatively largest image of a moving object in the video data, a comparatively largest moving object, a sharpest object in terms of image contrast, an object that is closest to the center of a frame, and/or various other features that identify or differentiate an object. The selection module selects the audio clip based on a comparatively loudest sound in the audio data, harmonic content of a portion of the data, recognized speech in the data, frequency analysis of the data, and/or various other features that identify or differentiate one or more sounds. The data transmission module transmits via at least one of satellite communications and IEEE standards 802.11, 802.11a, 802.11b, 802.11g, 802.11h, 802.11n, 802.16, and 802.20, among others. At least one of a standard military radio, a standard military pack radio, and a situational awareness application receive the portion of data over the remote communication link.

In other features, the remote command node requests the data recorded by the data recording device based on the portion and the event detection signal. An encryption module encrypts the portion prior to transmission over the remote communication link. The situational remote command node decrypts the portion following the transmission. The system also includes a secondary device, wherein the command node downloads the data recorded by the data recording device to the secondary device via a secondary communication link that has a higher bandwidth than the remote communication link.

In other features, a solid state data storage device stores the data. The solid state data storage device is a digital video recorder (DVR) that includes any type of digital storage medium. A tamper protection module automatically erases the data storage area in response to at least one of tampering and disabling at least one component in the system.

In other features, a sensor node includes a plurality of detectors. The sensor node generates the event detection signal based on communications with the detectors. The detectors include at least one type of detector including one of a passive infrared (PIR) detector, a seismic detector, a magneto-resistive detector, a radar detector, a lidar detector, an imaging detector, and a smart acoustic detector, among others.

In other features, a surveillance system includes a data recording device that digitally records at least one of video and audio data and a control module that includes a detection module. The detection module receives an event detection signal that indicates an event external to the surveillance system. The control module also includes a power control module that selectively switches the data recording device into an active mode from at least one of a low-power mode and an off mode based on the event detection signal. The control module also includes a selection module that selects a portion of the one of video and audio data based on at least one of detection of motion within the video data, detection of an object within the video data, detection of sound modulation in the audio data, and detection of a specific sound in the audio data. The system also includes a data transmission module that transmits the portion over a remote communication link.

In other features, a method for providing data within a surveillance system includes receiving an event detection signal that indicates an event external to the surveillance system. The method also includes selectively switching a data recording device into an active mode from at least one of a low-power mode and an off mode based on the event detection signal. The method also includes digitally recording at least one of video and audio data. The method also includes selecting a portion of the one of video and audio data based on at least one of detection of motion within the video data, detection of an object within the video data, detection of sound modulation in the audio data, and detection of a specific sound in the audio data. The method also includes transmitting the portion over a remote communication link.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 1:
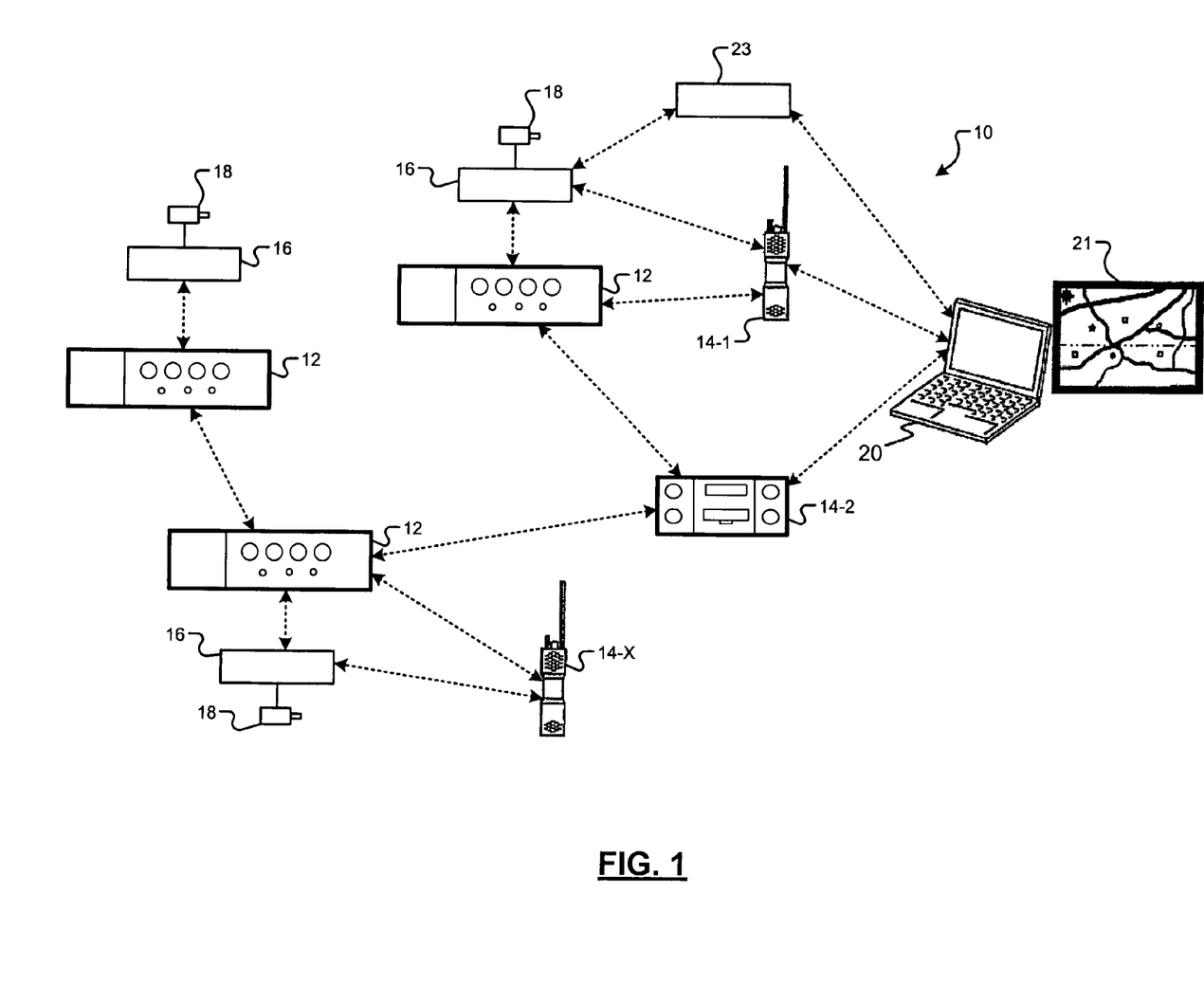
FIG. 1 is a functional block diagram of an intrusion detection and surveillance system according to the present disclosure.

Referring now to FIG. 1, an exemplary intrusion detection and surveillance system 10, which may be referred to as an unattended ground system, is illustrated. The system 10 includes a plurality of unattended sensor nodes 12 and one or more monitoring devices 14-1, 14-2, . . . , and 14-X (generally referred to as radios 14) and/or communication devices, such as standard military handheld and/or pack radios. Sensor nodes 12 are configured to gather surveillance data and broadcast the data across a remote communication link, such as a wide area wireless network. The nodes 12 may communicate directly with each other or may communicate via long range communication devices, such as satellites (not shown).

One or more remote control modules 16 collect and process video and/or audio surveillance data from one or more data recording devices 18, such as cameras and/or sound recording device that record video and/or audio data. The data recording devices 18 communicate with one or more of the nodes 12.

Surveillance data may be intended for a dedicated command node or gateway 20 and/or may be intercepted by various monitoring devices 14 residing in the network. An exemplary command node 20 includes situational awareness applications 21 that display sensor alarms in a geographical context. It is understood that the sensor nodes 12 may also serve as relays between other devices in the system 10.

According to an exemplary embodiment of the present disclosure, a sensor node 12 senses an event, such as a military vehicle and/or troop movement, in a predetermined zone of detection. The sensor node 12 notifies a control module 16 that an event is occurring. The control module 16 responds by activating a data recording device 18. For example, the data recording device 18 may be in an off mode or in a low-power mode (e.g. idle mode or sleep mode) and may enter an active mode based on control module signals. For example, the low-power mode includes shutting down some or all components (e.g. the transceiver) of the control module 16 and the data recording device 18. The data recording device 18 then records video and/or audio data within its frame of reference.

The control module 16 analyzes the video/audio data for motion, relevant objects, and/or relevant sounds. The control module 16 may include object recognition software to identify relevant objects, such as vehicles and combatants. The control module 16 may also include sound recognition software to identify relevant sounds, such as vehicle sounds or sounds corresponding to discharging of weapons. The control module 16 then generates a key frame of the video and/or a key audio clip.

A key frame is one or more (but generally one) frames of video that provides an indication of the event. A key audio clip is a sound clip that provides an indication of the event. For example, the control module 16 determines the key frame to be the frame of video that includes one of: the largest image of a moving object in the recorded video, the sharpest object in terms of image contrast in the recorded video, an object that is closest to the center of a frame of the recorded video, and/or various other features that identify or differentiate an object.

Alternatively, the control module 16 determines the key audio clip to include a sound clip that includes, for example, the loudest sound(s) in the recorded audio, a specific harmonic content, recognized speech, a specific frequency, and/or various other features that identify or differentiate one or more sounds. Both a key frame of video and a key audio clip may be referred to herein as a portion of data recorded by the data recording device 18.

The control module 16 transmits the key frame to the command node 20 and returns the data recording device 18 to the low-power mode. A determination is then made at the command node 20 or other device (e.g. radio monitoring device 14-X) in the system 10 whether or not to retrieve the entire recorded video/audio. Retrieval may include the command node 20 downloading the entire recorded video/audio from the control module 16 or the data recording device 18 and/or physical retrieval directly from the control module 16 or the data recording device 18. Alternatively, the command node 20 may command the control module 16 to offload the video/audio data wirelessly or through a wired link to another device, such as a mobile unit 23 including a laptop (not shown), that has a higher bandwidth than the wireless link otherwise used by the sensor nodes 12 and/or radios 14. The mobile unit 23 may therefore be removable and field replaceable without moving and/or replacing the control module 16.

Figure 2:
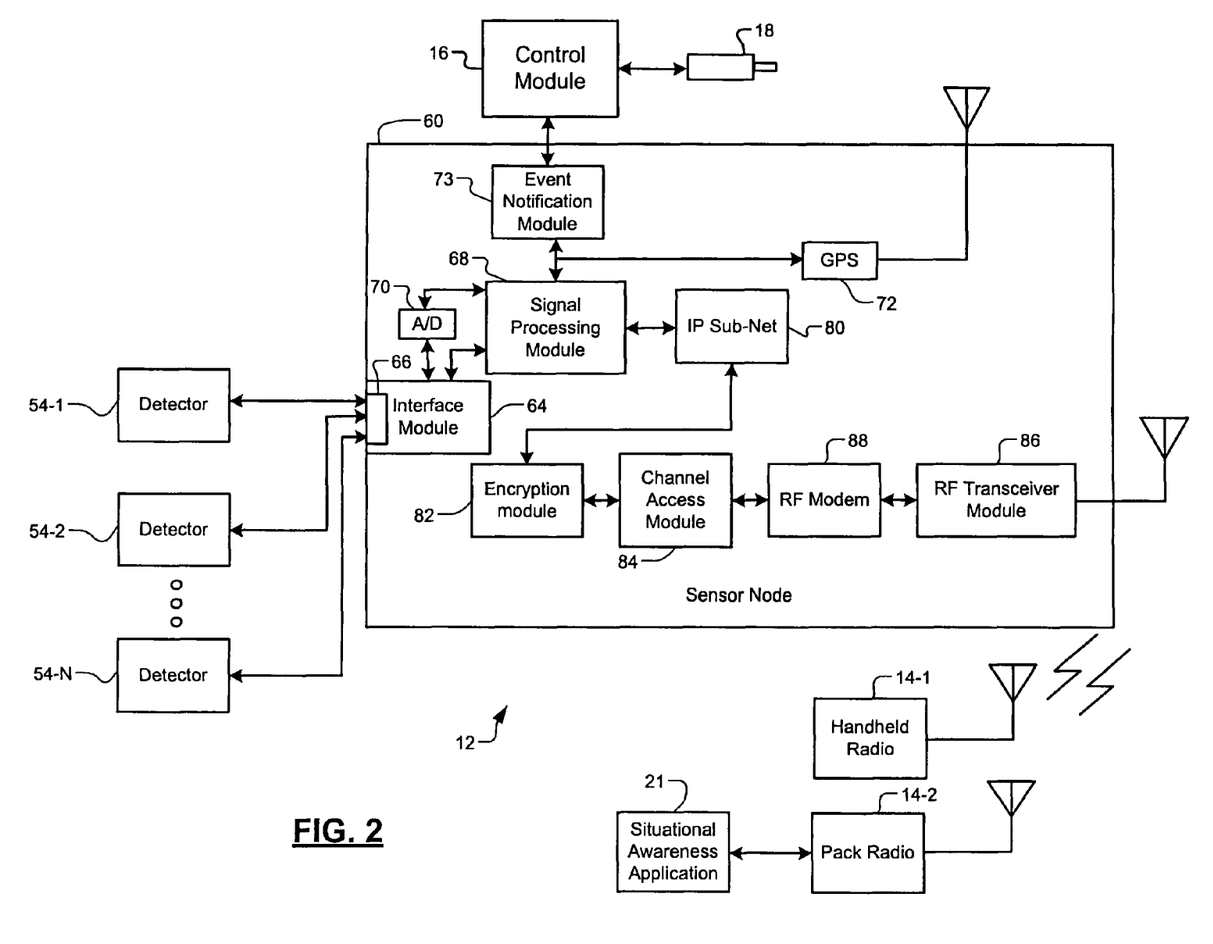
FIG. 2 is another functional block diagram of an intrusion detection and surveillance system according to the present disclosure.

Referring now to FIG. 2, a sensor node 12 includes one or more analog and/or digital detectors 54-1, 54-2, . . . , 54-N (collectively detectors 54) that communicate with standard military handheld and/or pack radios 14-1, 14-2, through a "sensor" 60. The detectors 54 may generate signals in response to a physical stimulus proximate to the detectors 54 and may include an internal power source or may receive power from, for example, the sensor 60. The radios 14 communicate directly or indirectly with command nodes 20.

The sensor 60 includes an interface module 64 ("interface") that may include a universal port 66 that communicates with both analog and digital detectors 54 that may be external to the interface 64. Although only one port 66 and one interface 64 are illustrated, one or more detectors may be integrated with and/or may communicate with numerous ports and/or interfaces. The port 66 or ports may include a plurality of pin configurations that are compatible with types of analog detectors, such as passive infrared (PIR), seismic, magneto-resistive, radar, and lidar detectors and/or types of digital detectors, such as imaging and smart acoustic detectors, among others.

A digital signal processing module 68 receives analog detector signals through the interface 64 and an analog-to-digital (A/D) converter 70. The signal processing module 68 also receives digital detector signals through interface 64 and global positioning system (GPS) signals through a GPS module 72.

The GPS module 72 may be embedded in the sensor 60 and may therefrom receive a timestamp as well as positional information. The digital signal processing module 68 in data communication with the GPS module 72 may opt to tag outgoing event messages with a timestamp of when the event occurred and/or positional information for the sensor 60. Other means for determining the current time or capturing positional information for the sensor are also contemplated by this disclosure. An event notification module 73 receives digital signal processing module 68 signals that indicate the event. The event notification module 73 then notifies the control module 16 that an event is occurring, and the control module 16 activates the data recording device 18.

An internet protocol (IP) sub-net 80 may process signals from the signal processing module 68 that may be encrypted in an encryption module 82. The IP sub-net 80 may use wireless IP voice and/or data channels that can be configured as plain text and/or cipher text, such as Citadel® encryption. A channel access module 84 determines and/or sets access to the encrypted signals for one of the radios 14.

In an exemplary embodiment, the Internet Protocol (IP) sub-net 80, which may include a packet converter, receives data from the signal processing module 68. The packet converter in turn organizes the data received from the signal processing module 68 into one or more data packets. The data packets are defined in accordance with the IP or some other transport protocol. In this way, the event messages may be sent to and received by other IP compatible devices residing in a network, which may include a intrusion detection and surveillance system. It is understood that event messages need not be sent in packet form.

A radio frequency (RF) transceiver module 86 of the sensor 60 may communicate with the radios 14 through an RF modem 88 according to, for example, IEEE standards 802.11, 802.11a, 802.11b, 802.11g, 802.11h, 802.11n, 802.16, and 802.20, among others. The aforementioned components may also be designed to be compatible with existing military radio technology. In other words, each of these components may be of military grade. For example, the RF modem 88 may implement a frequency hopping scheme; whereas, the RF transceiver module 86 may be a VHF network module that operates in the frequency range from 30 MHz to 108 MHz. Exemplary RF modems and RF transceiver modules can be found in various military grade radios such as the RF-5800 handheld radio and RF-5800 manpack radios commercially available from Harris Corporation. In this way, the sensor 60 is able to communicate with handheld radios as well as other communication devices deployed within a network. This provides reduced logistics in parts and training. In addition, it minimizes the lifecycle cost of a system if the user already owns a piece of the system or has multiple users.

To reduce channel contention, the sensor 60 may also employ the channel access module 84. Channel access is the scheme by which a radio node negotiates access and is granted permission to utilize a shared communication medium. In an exemplary embodiment, the sensor node 12 may use Multiple Access with Collision Avoidance (MACA) protocol or variants thereof. It is envisioned that other channel access protocols may be employed within the broader aspects of this disclosure. However, this protocol is particularly suited for mobile communication devices which use tactical line of sight VHF channels.

Figure 3:
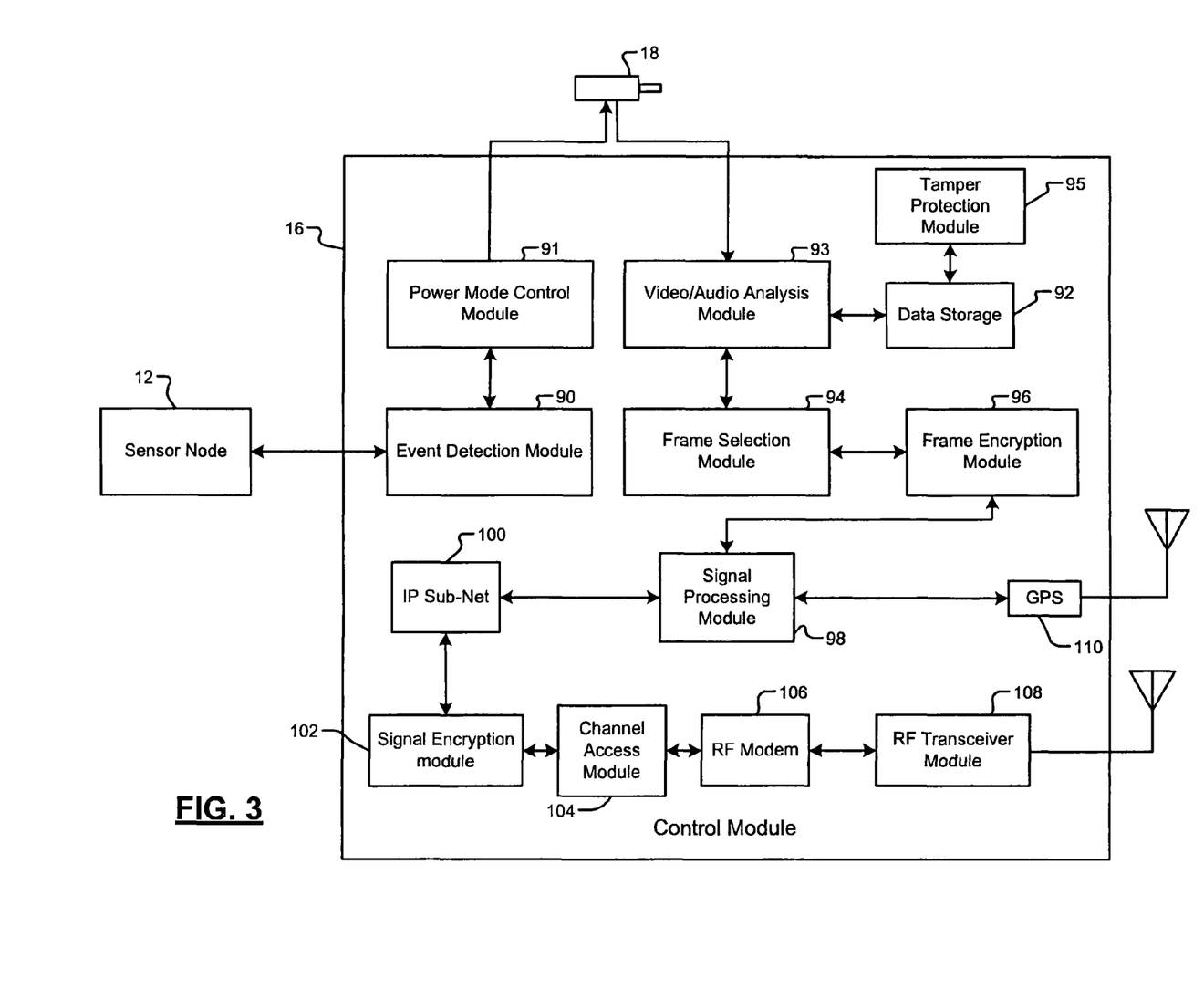
FIG. 3 is a functional block diagram of control module according to the present disclosure.

Referring now to FIG. 3, a control module 16 for a data recording device 18 includes an event detection module 90 that activates a power mode control module 91 when an event occurs. The power mode control module 91 switches the data recording device 18 between power modes. The power modes may include an off mode, a low-power mode (e.g. sleep or idle modes) and an active mode.

The data recording device 18 records data in the active mode. The power mode control module 91 switches the data recording device 18 for a predetermined time (e.g. approximately 30 seconds) and/or for a time based on a length of an event as indicated by the sensor node 12. For example, while the sensor node 12 is indicating an event is occurring, the power mode control module 91 switches the data recording device 18 into the active mode. When the sensor node 12 no longer indicates that an event is occurring, the power mode control module 91 switches the data recording device 18 into a low-power or off mode.

Either or both the data recording device 18 and control module 16 include a data storage area 92. The data storage area 92 includes a solid state device, such as a digital video recorder (DVR) that, may include any type of digital storage medium. Exemplary digital storage mediums include flash memory (including NAND and NOR flash memory). Although illustrated within the control module 16, the data storage area 92 may alternatively be included within the data recording device 18 or may be a stand-alone unit. The control module 16 may manage the data storage area 92 by, for example, erasing old data. Old data is data that has been present for a predetermined length of time, such as several days. Each of the data storage area 92, the data recording device 18, and the control module 16 may be battery powered via one or more batteries (not shown).

A tamper protection module 95 automatically erases the data storage area 92 in response to tampering or disabling of either or both the data recording device 18 and the control module 16. The tamper protection module 95 may determine tampering based on various sensors (not shown) that indicate that a housing (also not shown) for either or both the data recording device 18 and the control module 16 has been contacted and/or opened. Various other tamper protection techniques may also be used.

An analysis module 93 analyzes video and/or audio data from the data recording device 18. For example, the analysis module 93 detects motion and/or detects objects in video data. The analysis module 93 also detects sounds in audio data. In one embodiment, the data storage area 92 includes a library of images and/or sounds, and the analysis module compares the video/audio data to items in the library. For example, the library may include an image of a tank. When analysis module 93 detects an object resembling the tank, the analysis module flags the frame(s) that include the tank. Various other objects and/or image recognition schemes may also be used.

A frame selection module 94 selects a key frame image and/or key audio clip from the video and/or audio data. The frame selection module 94 determines the key frame to be one of the frames of video/audio flagged by the analysis module 93. For example, the frame selection module 94 selects the frame that includes the largest image of a moving object in the recorded video. Also, for example, the control module 16 determines the key audio clip to include the loudest sound(s), sounds including a specific harmonic/harmonic change, frequency/frequency modulation, etc. in the recorded audio.

A frame encryption module 96 encrypts the key frame/key audio clip in preparation for transmission. Any encryption scheme may be used provided the command node 20 recognizes the scheme. The control module 16 then transmits the key frame/key audio clip to the command node 20. The control module 16 transmits the key frame/key audio clip directly and/or via the RF transceiver 86 of the sensor 60.

Otherwise, for direct transmissions, the control module 16 includes a signal processing module 98 that prepares the key frame/key audio clip for transmission by, for example, modulating key frame/key audio clip data. The control module 16 then prepares and transmits the modulated data through one or more of an IP sub-net module 100, signal encryption module 102, channel access module 104, RF modem 106, RF transceiver module 108 and GPS module 110. The aforementioned module may function at least similarly to the corresponding modules in the sensor 60.

Figure 4:
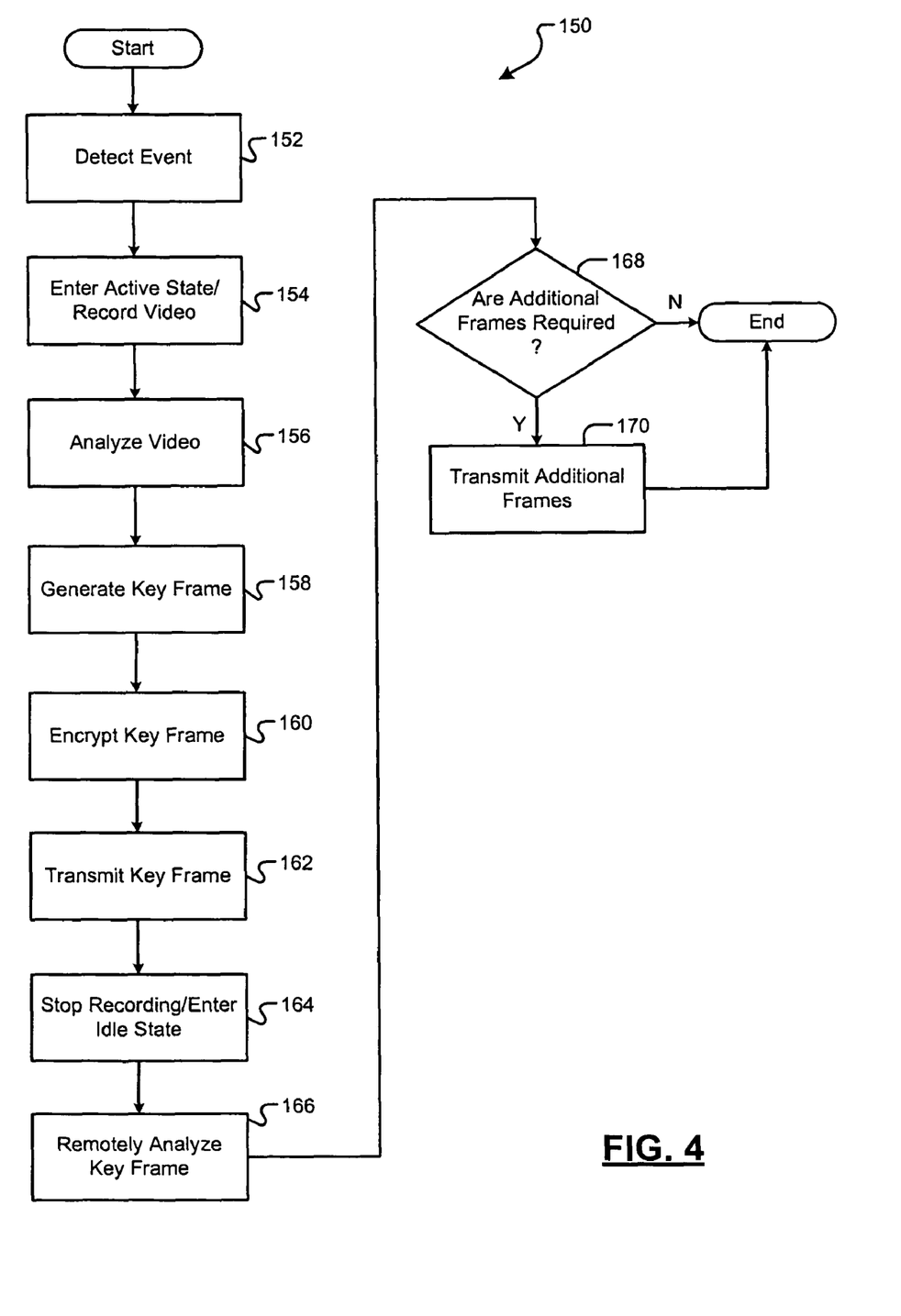
FIG. 4 is a flowchart of a method for operating a data recording device according to the present disclosure.

Referring now to FIG. 4, a flowchart 150 illustrates a method for operating a control module for an intrusion detection and surveillance system according to the present disclosure. Control starts in step 152 when one or all of the detectors sense an event, such as a military vehicle and/or troop movement, in a predetermined zone of detection. The sensor node notifies the control module that an event is occurring. The control module responds by activating the camera. For example, in step 154, the camera may be in an off mode or in a low-power mode and may enter an active mode based on control module signals. The camera then records video within its frame of reference.

In step 156, the control module analyzes the video for motion and/or relevant objects. The control module may include object recognition software to identify relevant objects, such as vehicles and combatants. In step 158, the control module generates a key frame of the video. The control module may encrypt the key frame in step 160 and transmits the key frame to the command node in step 162. In step 164, the control module returns the camera to the low-power mode. In step 166, a user may analyze the key frame image content via the command node. In step 168, the user determines whether or not to retrieve the entire recorded video and requests retrieval. In step 170, the control module remotely provides additional frames and/or the entire video.

Figure 5:
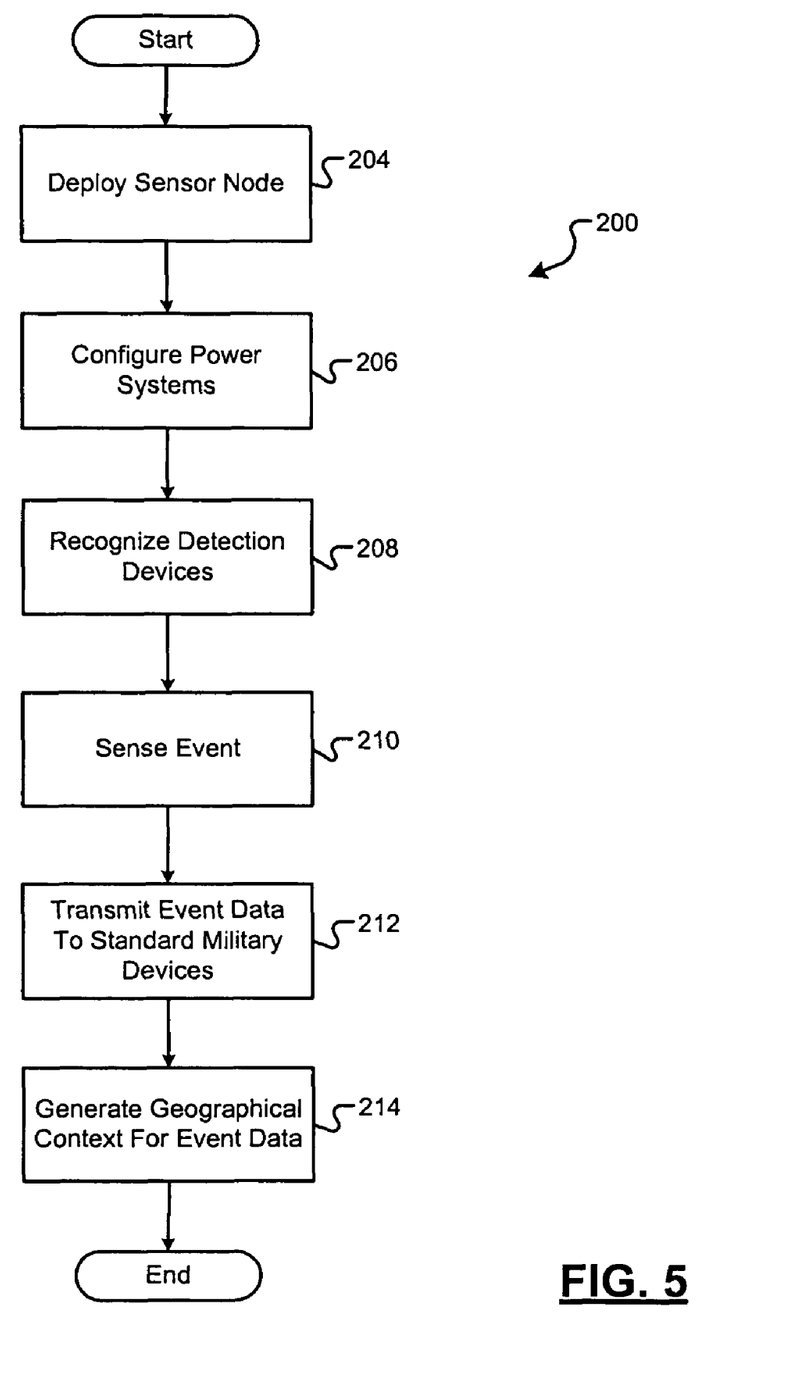
FIG. 5 is a flowchart of a method for operating an intrusion detection and surveillance system according to the present disclosure.

Referring now to FIG. 5, a flowchart 200 illustrates a method for operating an intrusion detection and surveillance system according to the present disclosure. Control starts in step 204 when a sensor node including a sensor and a plurality of detectors is deployed. In step 206, the sensor node may configure both detector and sensor power systems so that minimal power is consumed during operation of the sensor node. In step 208, the sensor may recognize (e.g. classify and determine type of) detection devices, such as detectors and cameras.

In step 210, following deployment, one or all of the detectors may sense an event, such as a military vehicle and/or troop movement, in a predetermined zone of detection. In step 212, the sensor node may interpret and transmit event data to standard military handheld radios and/or manpack radios. In step 214, a situational awareness application generates a visual geographical context based on handheld radio and/or manpack radio signals.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A surveillance system, comprising:
    an unattended sensor including
        an event module that receives an event detection signal that indicates an event external to the surveillance system;
        a power control module that selectively operates a data recording device at least partially concurrent with said event based on said event detection signal;
        a selection module that selects a portion of data recorded by said data recording device based on content of said data; and
        a data transmission module that transmits said portion of data over a wireless radio link;
        a channel access mechanism operable to negotiate access to the radio link in accordance with an access protocol;
        an encryption module interposed between the event module and the channel access mechanism and operable to encrypt said portion of data received from the selection module before negotiating access to the radio link; and
    a remote command node configured to receive said portion of data via the radio link from the unattended sensor and transmit a request for the data recorded by said data recording device to the unattended sensor, wherein the selection module cooperatively operates with the data transmission module to send the data recorded by said data recording device via the radio link to the remote command node in response to the request for the data.

2. The system of claim 1 further comprising said data recording device, wherein said data recording device records at least one of video and audio data.

3. The system of claim 2 wherein said power control module selectively operates said data recording device by switching said data recording device between power modes, wherein said power modes include at least two of an off mode, a sleep mode, an idle mode and an active mode.

4. The system of claim 2 further comprising an analysis module that determines said content of said data based on at least one of detecting motion and detecting objects in said video data.

5. The system of claim 2 further comprising an analysis module that determines said content of said data based on at least one of detecting sound modulation and detecting specific sounds within said audio data.

6. The system of claim 2 wherein said portion includes at least one of a video frame and an audio clip.

7. The system of claim 6 wherein said selection module selects said video frame to be one or more frames of video that include a comparatively largest image of an object that is moving in said video data, a sharpest image within said video data, and an object that is closest to the center of a frame of said video data.

8. The system of claim 6 wherein said selection module selects said audio clip to include at least one of a comparatively loudest sound in said audio data, a specific harmonic, recognized speech, and a specific frequency.

9. The system of claim 1 further comprising a secondary device, wherein said command node downloads said data recorded by said data recording device to said secondary device via a secondary communication link that has a higher bandwidth than said radio link.

10. The system of claim 1 further comprising a digital data storage device that stores said data.

11. The system of claim 9 further comprising a tamper protection module that automatically erases said data storage area in response to at least one of tampering and disabling at least one component in the system.

12. The system of claim 1 further comprising a sensor node comprising a plurality of detectors.

13. A surveillance system, comprising:
   a data recording device that digitally records at least one of video and audio data;
   a control module that comprises
      a detection module that receives an event detection signal that indicates an event external to the surveillance system,
      a power control module that selectively switches said data recording device into an active mode from at least one of a low-power mode and an off mode based on said event detection signal, and
      a selection module that selects a portion of said one of video and audio data based on at least one of detection of motion within said video data, detection of an object within said video data, detection of sound modulation in said audio data, and detection of a specific sound in said audio data; and
   a data transmission module that transmits said portion over a wireless radio link,
   a channel access mechanism operable to negotiate access to the radio link in accordance with an access protocol;
   an encryption module interposed between the selection module and the channel access mechanism and operable to encrypt and decrypt data sent over the radio link;
   wherein the selection module is further configured to receive a request over the radio link for data recorded by the digital recording device and cooperatively operates with the data transmission module to send the recorded data over the radio link in response to the request for the data.

14. The system of claim 13 further comprising a sensor node comprising a plurality of detectors, wherein said sensor node generates said event detection signal based on communications with said detectors.

15. The system of claim 13 further comprising at least one of a standard military radio, a standard military pack radio, and a remote command node running a situational awareness application that receives said portion over said remote communication link and that request said data based on said portion and said event detection signal.

16. A method for providing data within a surveillance system, comprising:
   receiving an event detection signal that indicates an event external to the surveillance system;
   selectively switching a data recording device into an active mode from at least one of a low-power mode and an off mode based on said event detection signal;
   digitally recording at least one of video and audio data;
   selecting a portion of said one of video and audio data based on at least one of detection of motion within said video data, detection of an object within said video data, detection of sound modulation in said audio data, and detection of a specific sound in said audio data;
   negotiating access to a wireless radio link in accordance with an access protocol;
   encrypting said portion of data prior to negotiating access to the wireless radio link;
   transmitting encrypted portion of data over the radio link;
   receiving a request at the data recording device for said one of video and audio data based upon a users review of said portion; and
   transmitting said one of video and audio data from the data recording device over the radio link in response to the request.

* * * * *